(12) United States Patent
Hackfort

(10) Patent No.: US 6,343,488 B1
(45) Date of Patent: Feb. 5, 2002

(54) FREEZING A GAS COMPONENT IN A GAS MIXTURE

(75) Inventor: Helmut Hackfort, Köln (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 09/554,070

(22) PCT Filed: Nov. 5, 1998

(86) PCT No.: PCT/DE98/03298

§ 371 Date: Jun. 28, 2000

§ 102(e) Date: Jun. 28, 2000

(87) PCT Pub. No.: WO99/24136

PCT Pub. Date: May 20, 1999

(30) Foreign Application Priority Data

Nov. 11, 1997 (DE) .......................................... 197 49 836

(51) Int. Cl.⁷ .................................................. F25J 1/00
(52) U.S. Cl. ........................................... 62/638; 62/909
(58) Field of Search ........................... 62/637, 638, 909

(56) References Cited

U.S. PATENT DOCUMENTS

| 3,073,128 A | * | 1/1963 | Becker ........................ 62/638 |
| 3,375,672 A | * | 4/1968 | Jakob ......................... 62/638 |
| 4,080,429 A | | 3/1978 | Koeppe et al. | |
| 4,668,261 A | | 5/1987 | Chatzipetros et al. | |
| 5,626,035 A | * | 5/1997 | Pozvonkov ................... 62/637 |
| 5,979,179 A | * | 11/1999 | Van Kesteren ............... 62/637 |

FOREIGN PATENT DOCUMENTS

| DE | 34 22 417 | 12/1985 |
| DE | 35 18 283 A1 | 11/1986 |
| DE | 196 35 002 | 3/1998 |
| FR | 2 272 951 | 12/1975 |
| FR | 2 653 029 | 4/1991 |

* cited by examiner

*Primary Examiner*—Ronald Capossela
(74) *Attorney, Agent, or Firm*—Herbert Dubno

(57) ABSTRACT

The invention relates to a method and a device for separating a gas component in a gas mixture by freezing. The gas component to be separated has the lower vapor pressure when compared with the other gas components in the gas mixture. A working temperature is chosen at which the gas components to be separated freezes out almost completely. The partial pressure of the other gas components at working temperature is kept lower than the vapor temperature of the other gas components at working temperature. Once the components to be separated have been frozen out, the other gases are evacuated. The device comprises at least two cooling tanks. Means are provided to alternately feed the gas mixture to the cooling tanks so that a predetermined partial pressure arises in each tank.

3 Claims, No Drawings

FREEZING A GAS COMPONENT IN A GAS MIXTURE

CROSS REFERENCE TO RELATED APPLICATION

This application is a national stage of PCT/DE 98/03298 filed Nov. 5, 1998 and based upon German national application 19749836.1 filed Nov. 11, 1997 under the International Convention.

FIELD OF THE INVENTION

The invention relates to a process for separating a gas component from a gas mixture by freezing out.

BACKGROUND OF THE INVENTION

From the publications DE 35 18 283 C2 and DE 196 35 002 A1, a process is known in which a gas to be continuously separated is evacuated from a cold trap. In this manner high degrees of purity are obtained.

A process of this type is also known from the publication DE 34 22 417 A1 for separating a gas component from a gas mixture by freezing out. A cold trap with a freezing stretch is provided. In the cold trap, the gas is subjected over a long residence time and on a very large cooling area to intensive heat exchange and mass exchange with the cooling or condensing surfaces. The cooling surfaces are generally formed as sheets running transversely to the gas flow direction.

A high degree of supersaturation of the gas within the cooling trap can thus be reliably avoided. The cold trap has no constrictions tending toward plugging up. The temperature is so controlled and monitored over the freezing stretch that at the gas input of the latter, the saturation temperature of the component to be frozen out prevails and at the outlet the saturation temperature corresponding to its desired residual concentration is maintained. Between the two, efforts are made to provide a substantially linear temperature profile. For that purpose, temperature sensors on the cooling sheets and a stepwise control of the stretch traversed by the coolant flow and additional heating with intervening heat damming stages are provided.

The known process requires a relatively high cost apparatus.

OBJECTS OF THE INVENTION

It is the object of the invention to provide a simple process of the type described in which the component to be separated can be obtained completely and with high purity. It is also an object of the invention to provide a process which can be carried out in a quasi continuous manner.

SUMMARY OF THE INVENTION

The objects are achieved with a process for separating out a gas component from a gas mixture by freezing out with the features:

a) the gas component to be separated has by comparison to the remaining gas components in the gas mixture, the smallest vapor pressure, b) an operating temperature is selected at which the gas component to be separated is frozen out, c) the gas mixture is subjected to the operating temperature, d) the partial pressures of the remaining gas components at the prevalent working temperature are held smaller than their vapor pressures at the operating temperature, and e) after the freezing out of the component to be separate, the solid left behind is separated from the remaining gases.

The remaining gases are separated by pumping them off from the solid left behind. The frozen gas separated from the remaining gases is then heated. An apparatus for carrying out the process can have a) at least two cooling vessels which are cooled to the operating temperature by coolant are provided, b) each of the two cooling vessels has a closeable inlet and outlet, c) a pump is connected with each of both outlets, d) means are provided which alternately feed the gas mixture to one and the other cooling vessel so that in the respective vessel a predetermined partial pressure is established.

The apparatus can have cooling sheets of increased surface area in the vessels.

According to the invention gas components are separated from a gas mixture which have the smallest vapor pressure. The vapor pressure of the remaining (other) components in the gas mixture should be clearly greater in comparison to the aforementioned smallest vapor pressure. The process can be carried out especially well and economically.

A working temperature should be so selected that the vapor pressure of the gas component to be separated is practically zero. The separation of the gas component with the smallest vapor pressure can then be effected especially economically.

A higher operating cost is not required.

An example of a gas mixture according to the claimed invention is a mixture of xenon and oxygen with 70 volume % xenon and 30 volume % oxygen. At a working temperature of 78 K., the vapor pressure of the gas component xenon is about $10^{-3}$ mbar and is approximately zero in the aforementioned sense. The vapor pressure of the gas component oxygen amounts to 228 mbar at 78 K and thus is significantly greater than that of xenon in the aforementioned sense.

According to the invention, the gas mixture is subjected to the working temperature. The prevailing partial pressure at the working temperature (or the partial pressures which predominates when three or more gas components are present in the gas mixture) of the gas component which is not to be frozen out should be less than the vapor pressure (prevailing at this working temperature) of this gas component. This insures that these gas components will not be condensed out or frozen out. In the case of xenon-oxygen gas mixtures the oxygen partial pressure of the oxygen component should be held less than 228 mbar when the gas mixture according to the invention is at its working temperature of 78 K. An operating temperature of 78 K can be economically achieved by cooling with liquid nitrogen. The oxygen partial pressure especially should be held at less than 200 mbar during the freezing out to obtain the desired results.

The gas component to be separated is thus frozen out. The other gas component or other gas components remain gaseous. If the lattice characteristics of the gas (in the frozen state) are sufficiently different, molecules or atoms of the other gas components will usually not be trapped in the lattice of the resulting solid body.

Several gas molecules or atoms are at most bound by adsorption to the surface of a resulting solid body.

A sufficient difference between the respective lattices is present, for example, between frozen xenon and frozen argon or between frozen xenon and frozen oxygen.

Since the gas components with the smallest vapor pressure are frozen out at the prevalent working temperature, the other gas components can be separated for example by pumping them off from the frozen gas. With increasing pumping duration, the adsorptively bound impurities are reduced by desorption and thus the degree of purity is increased. Following subsequent warming of the frozen gas there is produced by sublimation a gas with a correspondingly high purity.

In the case of xenon (90 volume %) argon (10 volume %) gas mixtures, after the freezing out it is only necessary to apply a prevacuum pump (two-stage rotary disk pump) for several minutes to obtain xenon with a purity of 99.9%.

The process is especially useful with xenon-nitrogen gas mixtures and xenon-krypton-nitrogen gas mixtures for the separation of xenon.

The invention can be carried out with very simple means and thus very inexpensively.

An apparatus for carrying out the process includes at least two cooling vessels (cooling traps, freezing stretches) which are cooled to working temperature. Each cooling vessel has a closeable inlet and outlet. A pump is connected with each outlet. The device further comprises means for alternately supplying the gas mixture to one and the other cooling vessel so that in the respective cooling vessel the desired partial pressure will be established. By the alternate supply of the gas mixture a continuous operation can be insured. If in one of the vessels there is a gas mixture or a gas mixture is passed through this vessel (flow through operation), the component to be separated is frozen out and the remaining gas is pumped out. Only the frozen out gas (solid) thus remains in the vessel. The solid can then be removed from the corresponding vessel in a suitable way. This can be achieved for example by heating. The resulting over pressure can be directly used to fill a gas bottle under pressure.

A 100% recovery of, for example, xenon from a gas mixture is thus possible without problems.

The process can basically be used with any gas mixture which fulfills the aforementioned conditions.

The apparatus has, in an advantageous embodiment, means for admitting the gas mixture into a vessel within which the gas mixture is conducted over cooled surfaces (cooling surfaces). This can insure that the gas mixture in every case will be guided over cooled surfaces on which the gas can be frozen out. The freezing out can be economically and reliably effected in a flow through operation of the gas mixture through the vessel.

In a further advantageous configuration, the apparatus can have surface enlarging cooling plates in the cooling vessel which can thereby increase the cooling power.

What is claimed is:

1. A process for separating a gas component from a gas mixture containing at least two gas components comprising the steps of:

a) providing an operating temperature at which the gas component to be separated has by comparison to any remaining gas component in the gas mixture, the smallest vapor pressure and at which the gas component to be separated is frozen out;

b) subjecting the gas mixture to the operating temperature while maintaining partial pressures of gas components remaining in a gaseous state at said operating temperature smaller than respective vapor pressures of said gas components remaining in said gaseous state at the operating temperature, thereby freezing out the gas component to be separated in a solid; and c) after freezing out of the component to be separated, separating said solid from a remaining gas.

2. The process according to claim 1 in which the remaining gas is separated from the solid by pumping it off from the solid left behind.

3. The process according to claim 2 in which the solid after separation from the remaining gas is then heated to form a gas phase of the gas component to be separated.

* * * * *